(12) United States Patent
Ng et al.

(10) Patent No.: US 7,265,339 B1
(45) Date of Patent: Sep. 4, 2007

(54) ENCODER INTERPOLATION APPARATUS

(75) Inventors: Kean Foong Ng, Penang (MY); Siang Leong Foo, Penang (MY)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 11/439,352

(22) Filed: May 22, 2006

(51) Int. Cl.
  *G01D 5/34* (2006.01)
(52) U.S. Cl. .................... 250/231.16; 341/13
(58) Field of Classification Search .......... 250/231.13, 250/231.16; 33/1 N, 1 PT; 341/11, 13, 341/31
  See application file for complete search history.

(56) References Cited

U.S. PATENT DOCUMENTS

| | | | | | |
|---|---|---|---|---|---|
| 5,347,355 | A | * | 9/1994 | Eguchi | ........................ 356/494 |
| 6,355,927 | B1 | * | 3/2002 | Snyder | .................. 250/231.13 |
| 6,747,262 | B2 | * | 6/2004 | Willhelm | .................. 250/208.2 |
| 6,816,091 | B1 | * | 11/2004 | Chee | ............................ 341/13 |

* cited by examiner

*Primary Examiner*—Thanh X. Luu
*Assistant Examiner*—Suezu Ellis (57) ABSTRACT

An interpolating detector for generating a position signal indicating a change in the relative position of a code pattern that includes alternating light and dark stripes is disclosed. The interpolating detector includes a photodiode array, an interpolation function generator, a detector function generator, and a cross-point detector. The photodiode array includes a plurality of sets of photodetectors that generate sinusoidal signals having different amplitudes and phases. The interpolation function generator generates first and second interpolation functions, $I_1(x)=f1\ cos(x)$ and $I_2(x)=f2\ sin(x)$, respectively, from the photodiode signals. The detector function generator generates 4 detector signals, $D_1(x)$-$D_4(x)$, from the photodiode signals. The cross-point detector generates a transition signal when $I_1(x)$ crosses $D_1$ or $D_3$ or when $I_2(x)$ crosses $D_2$ or $D_4$. The photodiodes have active areas having a shape such that the x values at which the interpolation signals cross the detector signals occur at integer multiples of $(2\pi/m)$ for a fixed m value.

8 Claims, 9 Drawing Sheets

ENCODER INTERPOLATION APPARATUS

BACKGROUND OF THE INVENTION

Encoders provide a measurement of the position of a component in a system relative to some predetermined reference point. Encoders are typically used to provide a closed-loop feedback system to a motor or other actuator. For example, a shaft encoder outputs a digital signal that indicates the position of the rotating shaft relative to some known reference position that is not moving. A linear encoder measures the distance between the present position of a moveable carriage and a reference position that is fixed with respect to the moveable carriage as the moveable carriage moves along a predetermined path.

An absolute shaft encoder typically utilizes a plurality of tracks arranged on a carrier that is typically a disk that is connected to the shaft. Each track consists of a series of dark and light stripes that are viewed by a detector that outputs a value of digital 1 or 0, depending on whether the area viewed by the detector is light or dark. An N-bit binary encoder typically utilizes N such tracks, one per bit. An incremental encoder typically utilizes a single track that is viewed by a detector that determines the direction and the number of stripes that pass by the detector. The position is determined by incrementing and decrementing a counter as each stripe passes the detector.

To determine the direction of motion, incremental encoders often utilize a system in which an image of a portion of the track is projected onto the surface of a detector that has a plurality of photodetectors such as photodiodes. The surface of each photodetector has an active area that has a shape that is determined by the shape of the bands in the code pattern, the resolution of the encoder, and other factors such as the distance between the code pattern carrier and the detector. The photodetectors must also be positioned relative to one another such that the output of the photodetectors can be processed to provide two signals that are out of phase with respect to one another. The direction of travel is ascertained by observing the phase relationship of these signals. This arrangement also has the advantage of improving the resolution of the encoder.

In both types of encoder, the ultimate resolution is determined by the stripe pattern and size of the detectors used to view the band pattern. To provide increased resolution, the density of the bands must be increased. For example, in a shaft encoder, the number of bands per degree of rotation must be increased. Similarly, in a linear encoder, the number of bands between the limits of the linear motion must be increased. However, there is a practical limit to the density of bands that is set by optical and cost constraints and the physical size of the encoder. This limit applies to both incremental encoders and absolute encoders, since the track of an absolute encoders having the highest number of bands has the same constraints as the single track of an incremental encoder.

One method for providing increased resolution without increasing the density of stripes is to utilize an interpolation scheme to provide an estimate of the position between the edges of the bands. Such schemes also require that the detector used to view at least the highest resolution track be constructed from a plurality of photodetectors that have a size and placement that depends on the particular encoder design. One type of interpolation scheme utilizes four photodetectors to construct two sinusoidally varying signals that differ in phase by 90 degrees. The crossing points of pairs of these signals are determined to define four intermediate points. These schemes improve the resolution by a factor of 4.

SUMMARY OF THE INVENTION

The present invention includes an interpolating detector for generating a position signal indicating a change in the relative position of a code pattern that includes alternating light and dark stripes. The interpolating detector includes a photodiode array, an interpolation function generator, a detector function generator, and a cross-point detector. The photodiode array includes a plurality of sets of photodetectors, each set is labeled with an index i that runs from 0 to N, the $i^{th}$ set includes photodiodes that generate four signals:

$A_i = O_i + F_i \sin(x)$, $B_i = O_i + F \cos(x)$ $A_i' = O_i - F_i \sin(x)$, and $B_i' = O_i - F_i \cos(x)$ when the code pattern moves across the photodiode array. Here, $F_i$ and $O_i$ are constants and x denotes a relative position of the code pattern with respect to the interpolating detector, x changing by $2\pi$ when the code pattern moves a distance equal to the width of one light stripe and one dark stripe. The interpolation function generator generates first and second interpolation functions, $I_1(x) = f1 \cos(x)$ and $I_2(x) = f2 \sin(x)$, respectively, from the photodiode signals. The detector function generator generates 4 detector signals, $D_1(x)$-$D_4(x)$, from the photodiode signals, $D_1(x)$ and $D_3(x)$ are proportional to $\sin(x)$ and $-\sin(x)$, respectively, and $D_2(x)$ and $D_4(x)$ are proportional to $\cos(x)$ and $-\cos(x)$, respectively. The cross-point detector generates a transition signal when $I_1(x)$ crosses $D_1$ or $D_3$ or when $I_2(x)$ crosses $D_2$ or $D_4$. The photodiodes have active areas having a shape such that the x values at which the interpolation signals cross the detector signals occur at integer multiples of $(2\pi/m)$, for a fixed m value greater than 4. In one aspect of the invention, the interpolation function generator includes a first circuit for summing selected ones of the photodiode signals to form a first summed signal.

DETAILED DESCRIPTION OF THE PREFERRED EMBODIMENTS OF THE INVENTION

Figure 1:
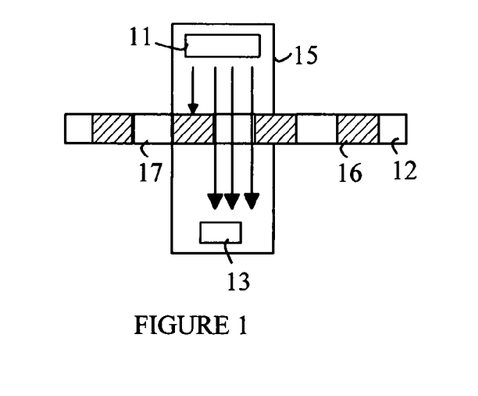
FIGS. 1-3 illustrate some typical encoder designs.
Figure 2:
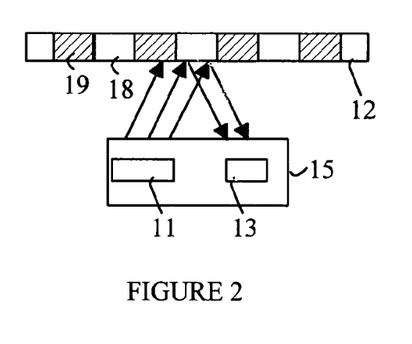
Figure 3:
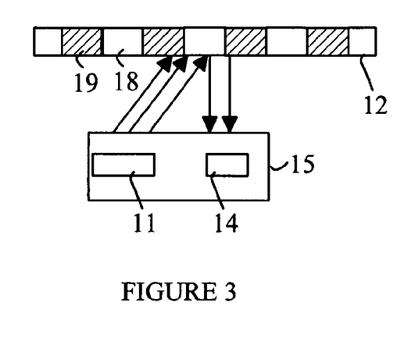

Refer now to FIGS. 1-3, which illustrate some typical encoder designs. The encoder can be divided into an emitter/detector module 15 and a code wheel or code strip. Module 15 includes an emitter 11 that illuminates a portion of the code strip 12. A detector 13 views the illuminated code strip. The emitter typically utilizes an LED as the light source. The detector is typically based on one or more photodiodes. FIG. 1 illustrates a transmissive encoder. In transmissive encoders, the light from the emitter is collimated into a parallel beam by a collimating optic such as a lens that is part of the emitter. Code strip 12 includes opaque bands 16 and transparent bands 17. When code strip 12 moves between emitter 11 and detector 13, the light beam is interrupted by the opaque bands on the code strip. The photodiodes in the detector receive flashes of light. The resultant signal is then used to generate a logic signal that transitions between logical one and logical zero.

FIG. 2 illustrates a reflective encoder. In reflective encoders, the code strip includes reflective bands 18 and absorptive bands 19. Again, the emitter includes a collimating optic such as a lens. The light from the emitter is reflected or absorbed by the bands on the code strip. The reflected light is imaged onto the photodiodes in the detector. The output from the photodetectors is again converted to a logic signal.

FIG. 3 illustrates an imaging encoder. An imaging encoder operates essentially the same as the reflective encoder described above, except that module 15 includes imaging optics that form an image of the illuminated code strip on the detector 14.

In each of these types of encoders, an image of one portion of the band pattern is generated on the photosensitive area of a photodiode in an array of photodiodes. To simplify the following discussion, drawings depicting the image of the code strip and the surface area of the photodetectors on which the image is formed will be utilized. In each drawing, the image of the code strip will be shown next to the photodiode array to simplify the drawing. However, it is to be understood that in practice, the image of the code strip would be projected onto the surface of the photodiode array. In addition, to further simplify the drawings, the light source and any collimating or imaging optics are omitted from the drawings.

Figure 4:
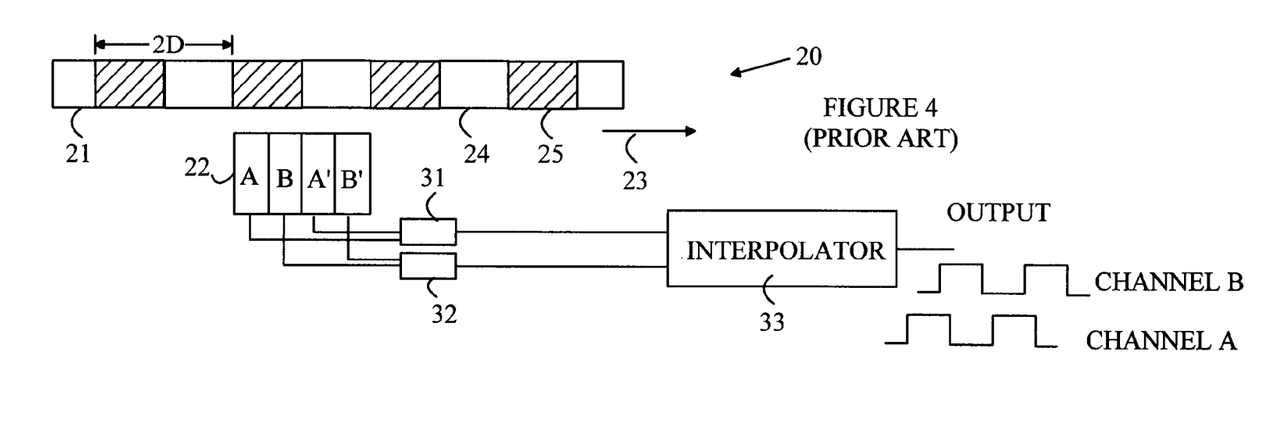
FIG. 4 illustrates a prior art two-channel encoder.

Refer now to FIG. 4, which illustrates a prior art two-channel encoder design that has been utilized in single-track linear encoders that detect the relative motion of the code strip. Encoder 20 includes a code strip that is imaged to form an image 21 that is viewed by a detector array 22. The image 21 of the code strip consists of alternating "white" and "black" stripes shown at 24 and 25, respectively. Denote the width of each stripe in the direction of motion of the code strip by D. The direction of motion is indicated by arrow 23. For the purposes of this example, it will be assumed that when a white stripe is imaged on a detector, the detector outputs its maximum signal value, and when a black stripe is imaged on the detector, the detector outputs its minimum value. It will also be assumed that the detector outputs an intermediate value when only a portion of a white stripe is imaged onto the detector.

Figure 5:
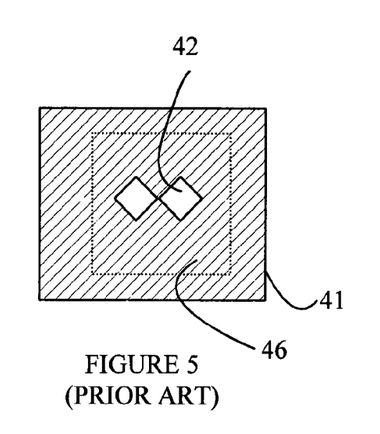
FIG. 5 is a top view of a photodiode.

Detector array 22 is constructed from 4 photodetectors labeled A, A', B, and B'. Each photodetector has an active area with a width equal to D/2. The A' and B' detectors are positioned such that the A' and B' detectors generate the complement of the signal generated by the A and B detectors, respectively. The shape of the signals generated by the photodetectors depends on the shape of the active area in each photodetector. The photodetector window is illuminated by a moving light signal that is a band of light. The output of the photodiode is proportional to the area on the semiconductor that is illuminated with light. Hence, if the height of the active area on the photodetector varies across the photodetector, the output signal also varies in a pattern determined by the shape of the active area. The effective width and height of the photodiodes can be varied by placing a mask over a rectangular photodiode as shown in FIG. 5, which is a top view of a photodiode. A mask 41 having a window 42 is placed over photodiode 46. The shape of the mask is selected such that the output of photodiode 46 varies in a sinusoidal manner about a constant offset signal level.

Figure 6:
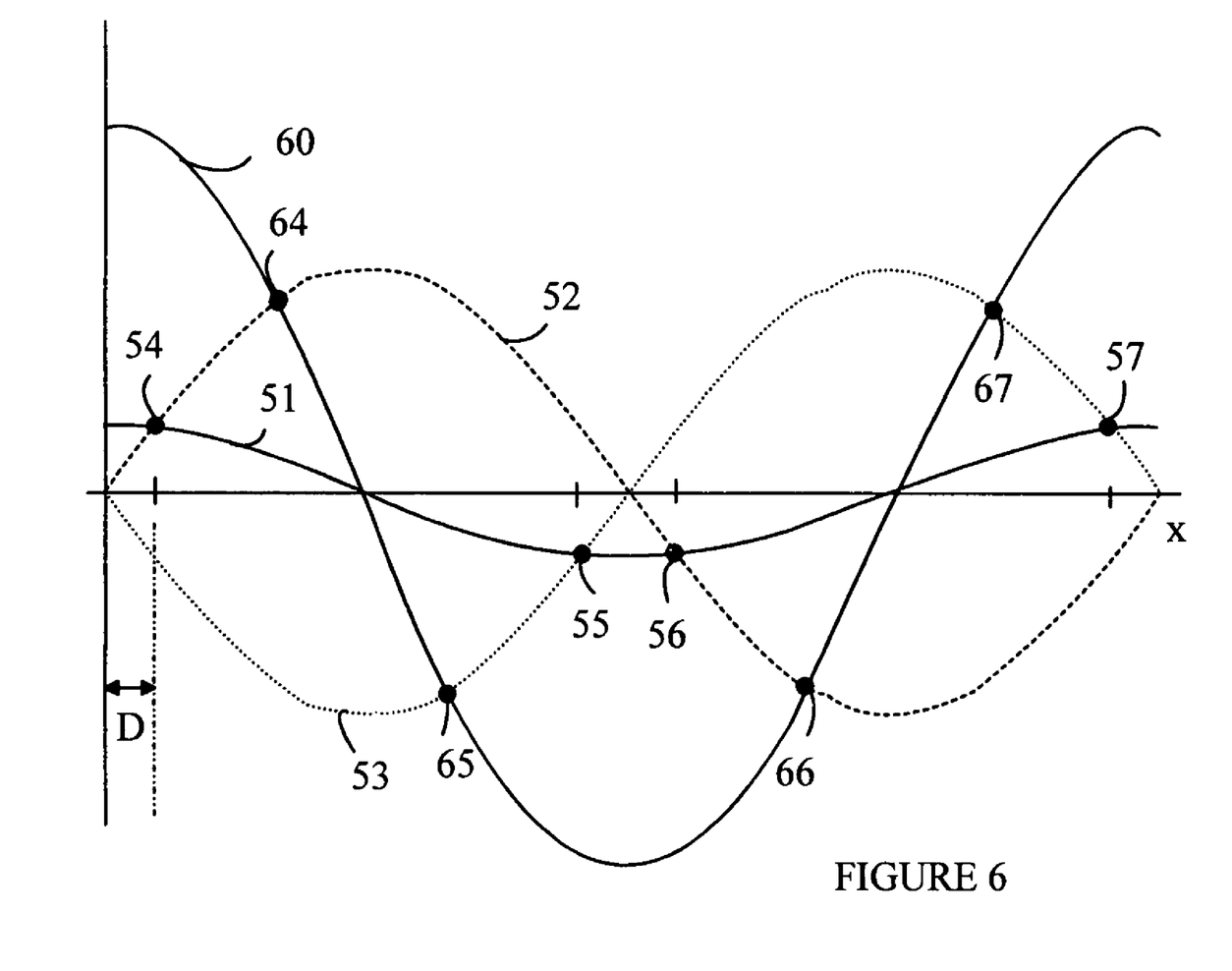
FIG. 6 illustrates the crossing points between an interpolation signal, $K\cos(x)$, and the detector signals $\sin(x)$ and $-\sin(x)$.

Referring again to FIG. 4, the signal offset can be removed by taking the difference of the two signals. Circuits 31 and 32 provide this processing and generate two signals that are sinusoidal as shown in FIG. 6. Referring again to FIG. 4, the resulting signals are then used by interpolator 33 to generate two output signals, channel A and channel B, that differ in phase by 90 degrees and have edge transitions at a spacing corresponding to D/2. The relative phase of the output signals is determined by the direction of travel.

For the purpose of this discussion, interpolator 33 will be said to provide a factor of N interpolation if the output of interpolator 33 has N cycles of a square wave having a high period and a low period of duration D/N. That is, the output will have 2N transitions between the high and low states when the code strip moves through a distance of 2D. As noted above, prior art interpolators can provide a factor of two interpolation with this definition.

Consider a four-detector array in which each detector outputs one cycle of a sine wave when the code strip moves a distance of 2D. In this case, the A detector outputs sine(x), the B detector outputs cos(x), the A' detector outputs −sin(x), and the B' detector outputs −cos(x), where x runs from 0 to 360 degrees when the code strip moves through a distance of 2D. To provide a factor of N interpolation, the interpolator must define 2N intermediate points within the 2D interval for each of two signals. In the present invention, these points are defined by determining the positions of the code pattern relative to the detector array at which one of the detector output signals crosses one of a number of interpolation signals. Each of the interpolation signals is a sinusoid having an amplitude that differs from the four detector signals discussed above and the same period as the detector signals.

The manner in which the interpolation signal amplitude is chosen can be more easily understood with reference to FIG. 6, which illustrates the crossing points between an interpolation signal, Kcos(x), and the detector signals sin(x) and −sin(x). Here, K is a constant. As can be seen from this figure, the interpolation curve 51 crosses the sin(x) curve 52 at two points shown at 54 and 56. Similarly, the interpolation curve crosses the −sin(x) curve 53 at two points shown at 55 and 57. The location of the crossing points is determined by the value of K. That is D is a function of K. For example, if K is increased, as shown at 60, points 54-57 move to the positions shown at 64-67, respectively.

Figure 7:
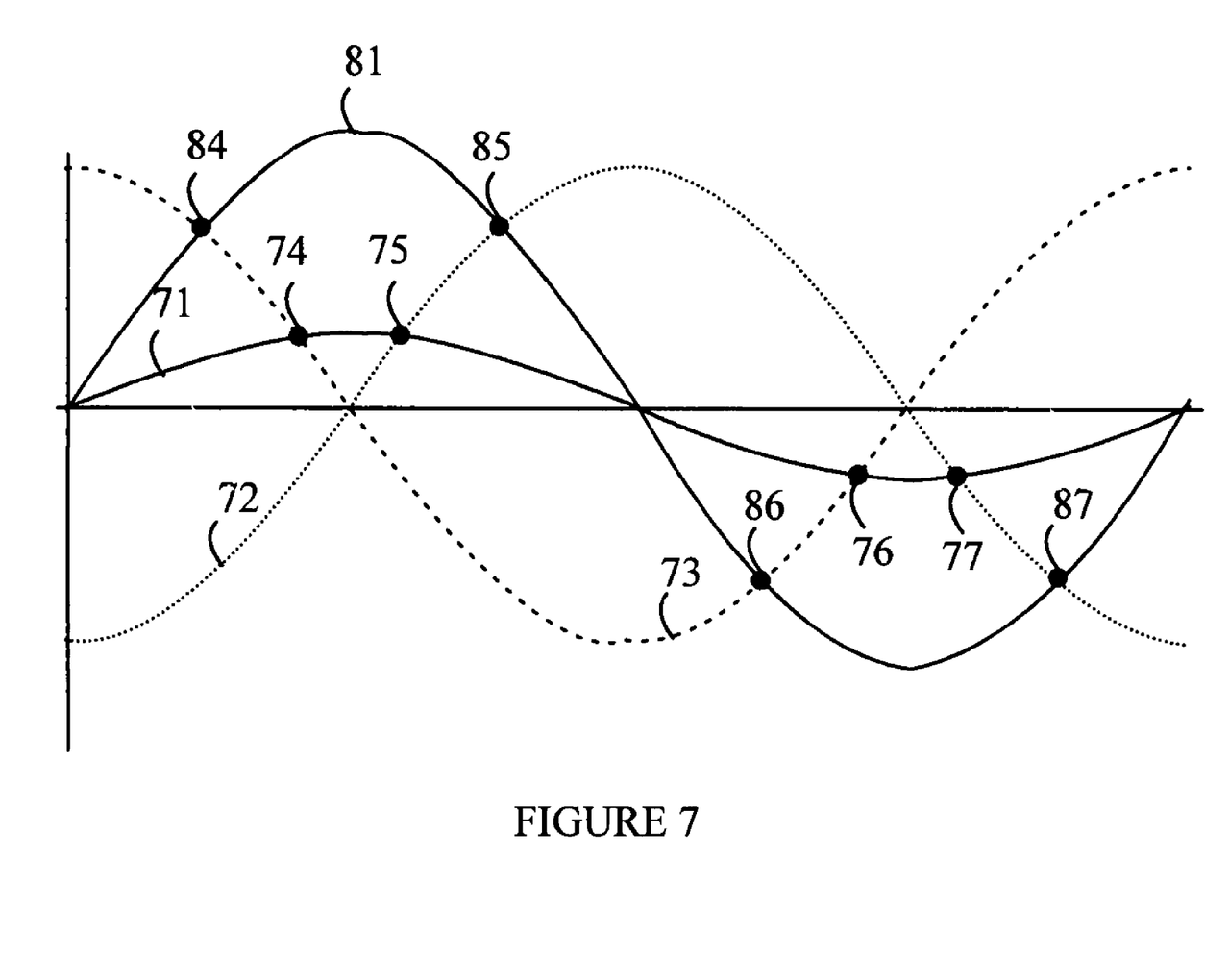
FIG. 7 illustrates the crossing points for an interpolation signal $K'\sin(x)$ with the detector signals $\cos(x)$ and $-\cos(x)$.

Refer now to FIG. 7, which illustrates the crossing points for an interpolation signal K'sin(x) with the detector signals cos(x) and −cos(x) shown at 72 and 73, respectively. Curves 71 and 81 illustrate the interpolation signal for two different values of K'. As can be seen from FIG. 7, the cross-points for curve 71 move from 74-77 to 84-87, respectively, when the value of K' is increased.

It should be noted that K'sin(x) interpolation function can be used to define cross points between 45 degrees and 135 degrees by varying K' from between 0 and 1. Similarly, the Kcos(x) interpolation function discussed above can be used to define points between 0 and 45 degrees and between 135 degrees and 180 degrees for values of K between 0 and 1. Hence, any set of crossing points can be provided by using the appropriate interpolation function with a coefficient between 0 and 1.

The number of crossing points for a set of interpolation curves is 4 regardless of the value of K. Hence, additional interpolation curves must be used to provide the necessary number of crossing points. A second set of crossing points can be defined by using the crossing points for the interpolation curve K'sin(x) and the detector signals cos(x) and −cos(x). It should also be noted that the points at which sin(x)=−sin(x), or cos(x)=−cos(x) can be used to provide two additional crossing points in the interval in question. Hence, a factor of 5 interpolation can be obtained with one sine interpolation curve and one cosine interpolation curve. To provide the second set of interpolation points needed to define the 90-degree out of phase output signal, two additional interpolation curves are needed.

For example, in a 5X interpolator, the two four interpolation functions needed to provide the channel A output points are $\tan(\pi/5)*\cos(x)$ and $\cot(2\pi/5)*\sin(x)$. The points at which the cos(x) interpolation function crosses sin(x) and −sin(x) define 4 of the 10 points. The points at which the sin(x) interpolation function crosses cos(x) and −cos(x) define 4 additional points. As noted above, the point at which sin(x) and cos(x)=0 define the remaining 2 points. The channel B signal is defined in an analogous manner using the interpolation functions, $\tan(\pi/10)*\cos(x)$, and $\cot(3\pi/10)*\sin(x)$.

In principle, the interpolation functions can be provided by mathematically processing the detector signals in a suitable signal-processing chip. For example, the detector curves could be processed digitally and sin(x) and cos(x) signals multiplied by the desired K and K' values to provide the interpolation signals needed for the particular interpolation algorithm being utilized. However, this approach involves a considerable expense, and hence, is not possible for many low cost interpolator designs. In addition, the computational time can result in delays that lead to position errors, since the code scale image is moving during the computational process.

A second possible method for generating the interpolation curves relies on analog signal processing circuitry to multiply the detector signals by the appropriate constants. Since the constants are between 0 and 1, the relevant circuitry can be implemented by resistive dividers. However, this approach is also less than ideal. First, the resistors must be fabricated on the interpolator IC. There is a limit to the accuracy with which the two resistors can be fabricated, and hence, the interpolation points could have significant errors. Second, a new integrated circuit is required each time the interpolation factor is changed. This increases the development time. In addition, this approach is not practical for parts that do not have a sufficient market to cover the development costs. Furthermore, resistive dividers reduce the signal-to-noise ratio and introduce delays because of the inherent RC time constants of the dividers. When the code scale is moving rapidly as in the case of a shaft being turned at a high number of RPM, this delay can introduce errors.

Figure 8:
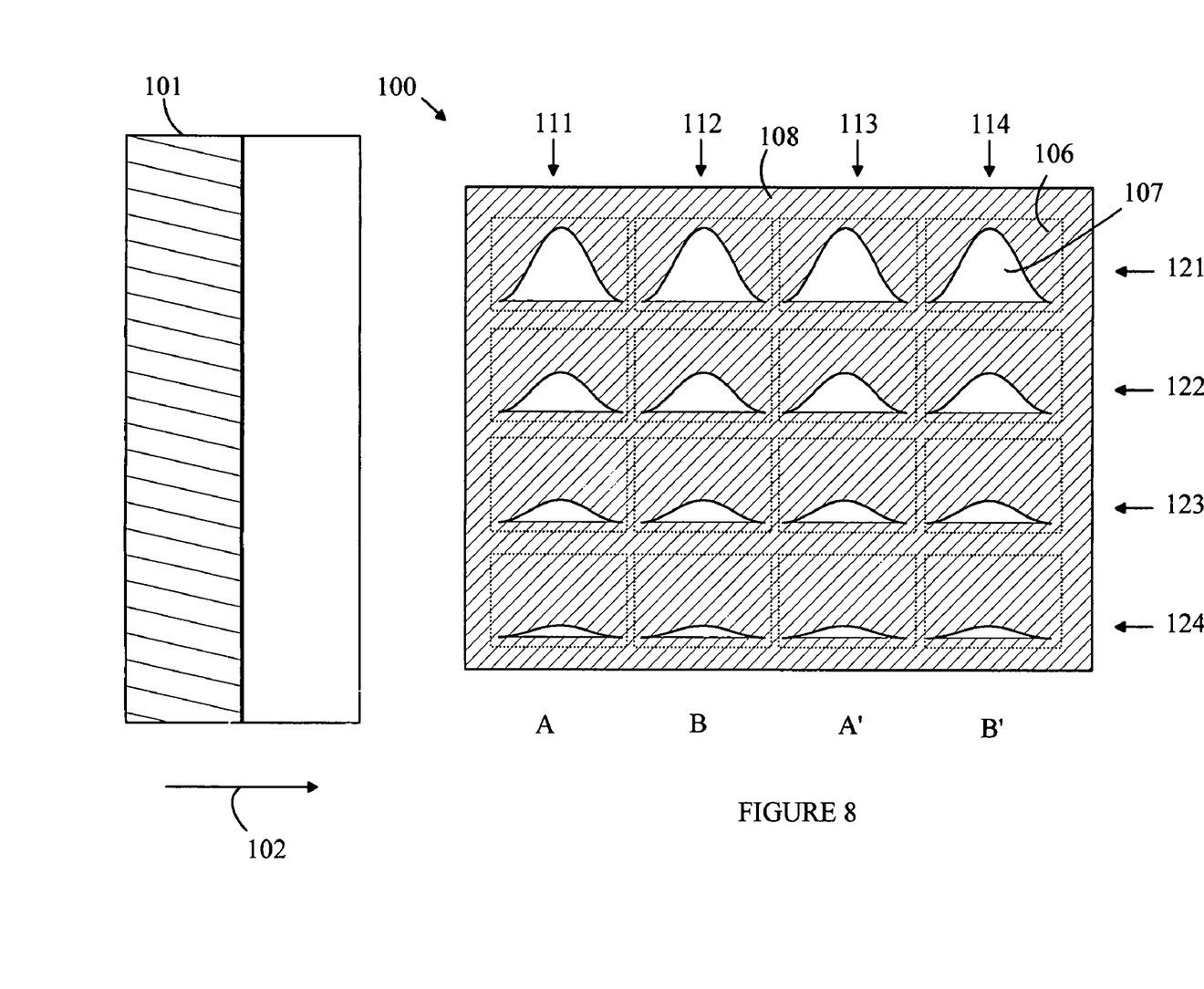
FIG. 8 is a top view of a photodiode array according to one embodiment of the present invention.

The present invention avoids these problems by using photodiode arrays to generate the interpolation signals. To simplify the following discussion, the present invention will first be explained with respect to a linear encoder in which the code scale pattern consists of a repeated pattern of light and dark stripes that are rectangular. Refer now to FIG. 8, which is a top view of a photodiode array according to one embodiment of the present invention. Photodiode array 100 includes a number of photodiodes arranged in a rectangular array having a plurality of rows and columns. The columns are shown at 1111-114, and the rows are shown at 121-124. A typical photodiode is shown at 106 and includes a window 107 in a mask layer 108.

The code scale image 101 moves across photodiode array 100 in the direction shown by arrow 102 such that all photodiodes in a given column are illuminated together. That is the windows in each column are aligned with one another such that the same fraction of each window is illuminated when a bright stripe moves across the column. The four photodetectors in $i^{th}$ row generate four signals $A_i$, $A_i'$, $B_i$, and $B_i'$ that are analogous to the A, A', B, B' signals discussed above. For the purposes of this discussion, it will be assumed that the code strip image and the windows are aligned such that $$A_i = O_i + F_i * \sin(x),$$

$$B_i = O_i + F_i * \cos(x)$$

$$A_i' = O_i - F_i * \sin(x), \text{ and}$$

$$B_i' = O_i - F_i * \cos(x). \tag{1}$$

It should be noted that the constants, $O_i$ and $F_i$ are determined by the maximum height of the windows in the row. Since all of the functions in a given column have the same x-dependence, all of the windows have the same width.

Assume that the first row of photodiodes generates the detector signals discussed above. Then by setting the relative heights of the windows in the other rows, those rows can be used to generate the interpolation signals discussed above. It should be noted that by taking the differences of the $A_i$ and $A_i'$ signals for a given row, the functions $2F_i \sin(x)$ and $-2F_i \sin(x)$ can be generated. Similarly, the functions $2F_i \cos(x)$ and $-2F_i \cos(x)$ can be generated by taking the differences of the $B_i$ and $B_i'$ signals in a row, i.e., $B_i - B_i'$ and $B_i' - B_i$, respectively. To simplify the following discussion the difference signals discussed above will be denoted as follows $$a_i = f_i * \sin(x),$$

$$b_i = f_i * \cos(x)$$

$$a_i' = f_i * \sin(x), \text{ and}$$

$$b_i' = f_i * \cos(x) \tag{2}$$

where $$f_i = 2F_i.$$

Figure 9:
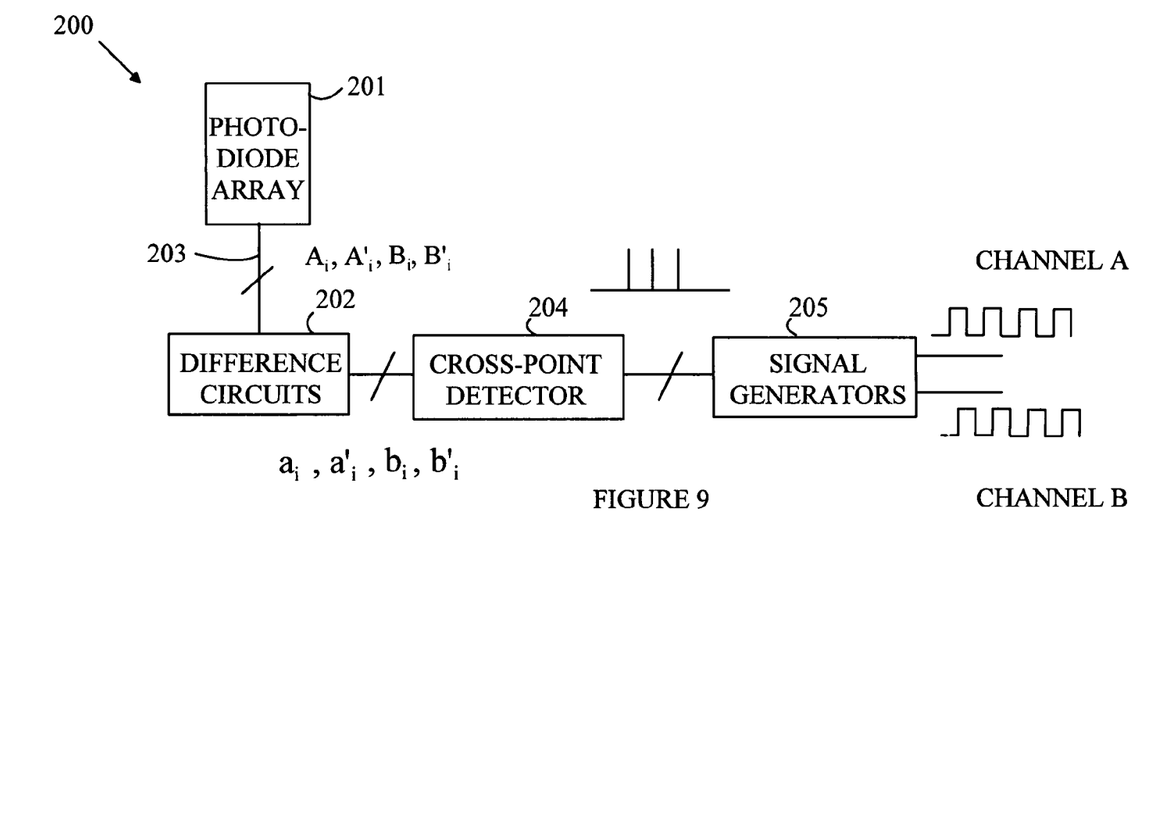
FIG. 9 illustrates an interpolating detector according to one embodiment of the present invention.

Refer now to FIG. 9, which illustrates an interpolating detector according to one embodiment of the present invention. Detector 200 includes a photodiode array that is analogous to the photodiode array shown in FIG. 8. The number of rows of photodetectors, N, will depend on the specific interpolation algorithm being executed by the detector. Photodiode array 201 outputs a set of four signals. $A_i$, $B_i$, $A_i'$, and $B_i'$ on bus 203 for i=1, to N. These signals have the functional dependence described above with reference to FIG. 8. A set of difference circuits 202 removes the offsets from these functions to generate the functions shown in Eq. (2). These output signals are input to a set of comparator circuits that determine the points at which selected pairs of these output signals cross. When a crossing event is detected, circuit 204 generates a signal that is sent to signal generator 205 which, in turn, causes the state of either the channel A or the channel B signal to change depending on the particular crossing point that was detected.

This process can be more easily understood with respect to the 5X interpolation example discussed above. To simplify the following discussion it will be assumed that each interpolation function is generated from the signals in a row of photodiodes devoted to that signal. In this case, photodiode array 201 would include 5 rows of photodiodes. The first row of photodiodes generates the functions $\sin(x)$, $\cos(x)$, $-\sin(x)$ and $-\cos(x)$. The remaining 4 rows of photodiodes generate the interpolation functions. That is, $b_2=\tan(\pi/5)*\cos(x)$, $a_3=\cot((2\pi/5)*\sin(x)$, $b_4=\tan((\pi/10)*\cos(x)$, and $a_5=\cot(3(\pi/10)*\sin(x)$.

The cross-point detector circuit 204 generates transition signals for channel A when $b_2=a_1$, $b_2=a_1'$, $a_3=b_1$, or $a_3=b_1'$. In addition, cross-point detector 204 generates a channel A transition signal when $a_1'=a_1$. In addition, cross-point detector 204 generates transition signals for channel B when $a_3=b_1$, $a_3=b_1'$, $b_4=a_1$, $b_4=a_1'$, or $b_1=b_1'$ In the example discussed above, the photodiode array had 5 rows of photodiodes and each of the windows in a given row had the same height. However, it should be noted that only two of the photodiodes in each of the last 4 rows are utilized. For example, only the $B_2$ and $B_2'$ photodiodes in row 2 are used. The photodiodes corresponding to $A_2$ and $A_2'$ are not needed. Similarly only the $A_3$ and $A_3'$ photodiodes in row 3 are used. Hence, if A photodiodes in a row are allowed to have a different window height than the B photodiodes in that row, all of the photodiodes in the row can be utilized and the number of rows needed to generate the interpolation functions can be reduced by a factor of 2. For example, the unused photodiodes $A_2$ and $A_2'$ can be used to generate the $\cot((2\pi/5)*\sin(x)$ interpolation function for using windows that differ in height from the windows over the photodiodes corresponding to $B_2$ and $B_2'$.

In the above-described embodiments, the interpolation functions are generated by constructing photodiodes in which the ratio of the window height between diodes in the first row and the diodes in the row corresponding to the interpolation function in question is set to provide the desired f-value. Hence, if the interpolation function is altered, a new set of photodiodes must be constructed and changes must be made to the cross-point detector. For example, if a 10X interpolator is needed, 20 transition points must be defined for each channel. Accordingly, additional interpolation functions must be added to provide the 10 additional points. In addition, additional comparators must be added to cross-point detector 204 and wired to the appropriate outputs of the difference circuits 202. Hence, each interpolating detector is unique. This increases the cost of providing this type of detector.

Consider a photodiode array in which there are N+1 rows of photodiodes, labeled 0 through N, that generate signals as shown in Eq. (1) above. In the above-described embodiments, the coefficients were set such that each row provided one of the interpolation functions, and the first row provided the 4 detector signals, $\pm\sin(x)$, $\pm\cos(x)$ after the appropriate signals were subtracted to remove the offsets. In one embodiment of the present invention, the interpolation functions are generated by summing the outputs of a plurality of photodiodes in different rows, rather than by setting the height of the windows in each row such that the row in question generates the desired interpolation function. For the purposes of this discussion, the $k^{th}$ cosine interpolation function will be denoted by $Ic_k(x)=fc_k\cos(x)$ and the $k^{th}$ sine interpolation function will be denoted by $Is_k(x)=fs_k\sin(x)$. As noted above, each transition point is defined by the x-value when one of the interpolation functions crosses one of the detector functions or by the point at which one of the detector functions crosses another one of the detector functions. The photodiode array windows are chosen such that $$Is_k(x)=\Sigma w_{ki}(A_i(x)-A_i'(x))$$

$$Ic_k(x)=\Sigma w'_{ki}(B_i(x)-B_i'(x)) \quad (3)$$

where, the summation is over i from 1 to N, and $w_{ki}$ and $w'_{ki}$ are 0 or 1. Here, it is assumed that the first row, N=0, is used to generate the detector signals, $Dc(x)=\cos(x)$, $Dc'(x)=-\cos(x)$, $Ds(x)=\sin(x)$, and $Ds'(x)=-\sin(x)$. Each transition point is now defined by a crossing point between one of the interpolation signals and one of the detector signals or two of the detector signals. Each interpolation signal is generated by selectively combining the outputs of specific rows of photodiodes. In the arrangement shown in Eq. (3) the signals on each row are subtracted from one another and the result summed for the selected signals needed to generate a particular interpolation function. However, the signals from the detectors on the various rows could be summed and then the differences of the sums computed, i.e., $$Is_k(x)=\Sigma w_{ki}A_i(x)-\Sigma w_{ki}A_i'(x)$$

$$Is_k(x)=\Sigma w'_{ki}B_i(x)-\Sigma w'_{ki}B_i'(x). \quad (4)$$

It should be noted that, in general, the interpolation signals defined by Eq. (3) are approximations to the interpolation signals discussed above with respect to Eq. (2). The accuracy of the approximation depends on the number of photodiodes in the photodiode array. In one embodiment of the present invention, the height of each of the windows is set such that $2F_i=F_{i-1}$. In this case, the $w_{ki}$ are related to the bits of the binary representation of the constant K for an interpolation function K $\sin(x)$, and the $w'_{ki}$ are related to the bits of the binary representation of the constant K' for an interpolation function K' $\cos(x)$.

It should also be noted that the number of rows in the photodiode array does not depend on the interpolation factor. The interpolation factor sets the number of interpolation functions needed to define the transition points of the channel signals. Each interpolation function is constructed from a unique sum of the photodiode outputs in the photodiode array. The number of photodiodes in the photodiode array sets the accuracy of the interpolation functions. Hence, a single photodiode array can be utilized for a number of different interpolators.

Figure 10:
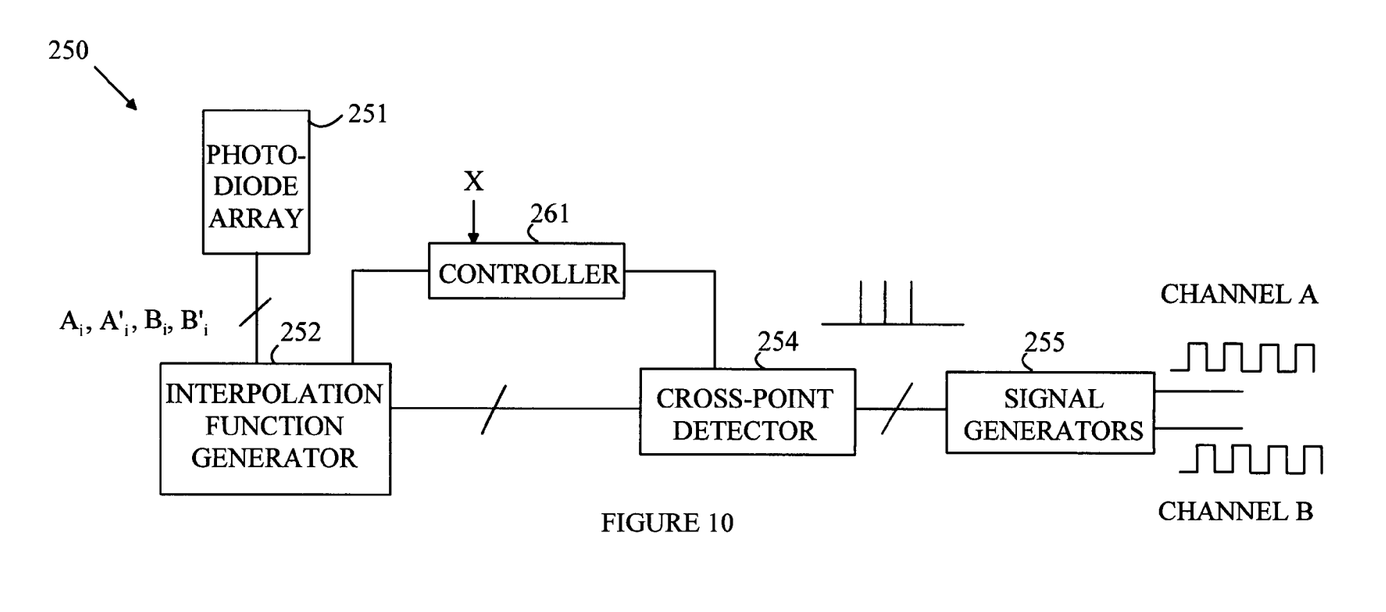
FIG. 10 illustrates an interpolating detector according to another embodiment of the present invention.

Refer now to FIG. 10, which illustrates an interpolating detector according to another embodiment of the present invention. Interpolation detector 250 includes a photodiode array 251 having N+1 rows of photodiodes, where N>4. The outputs of the photodiodes are processed by an interpolation function generator 252 that computes the interpolation functions by applying the relations discussed above with respect to Eqs. (3) and (4). The specific photodiodes to incorporate in each interpolation function are specified by controller 261 that is programmed to provide the desired interpolation factor X. The interpolation functions needed to define the cross-points are then input to cross-point detector 254 that provides the transition signals to signal generator 255 that generates the channel A and channel B signals.

While the total number of interpolation functions needed to implement a given interpolation factor, X, is a function of the interpolation function, the number of interpolation functions that must be monitored at any given time is not a function of X. Hence, an interpolation detector can be constructed in which only the code in the controller needs to be changed to implement a particular X value.

The manner in which a general interpolation detector is implemented can be more easily understood with respect to a specific interpolation factor. Refer again to the 5X interpolation example discussed above. To simplify the following discussion only the transitions points corresponding to the channel A signal will be discussed in detail. There are 10 such transition points. Assuming that the points start at x=0 in FIG. 6, the $i^{th}$ point is located x=36*(i−1) degrees when the code pattern is traveling in the direction corresponding to increasing x values. The interpolation functions and crossing points corresponding to these interpolation points are shown in table I, below. It is assumed that increasing point values correspond to x increasing.

TABLE I

5X Interpolation Points for Channel A

| point | x-value | interpolation function | detector function |
|---|---|---|---|
| 1 | 36 | f1cos(x) | sin(x) |
| 2 | 72 | f2sin(x) | cos(x) |
| 3 | 108 | f2sin(x) | −cos(x) |
| 4 | 144 | f1cos(x) | −sin(x) |
| 5 | 180 | sin(x) | −sin(x) |
| 6 | 216 | f2cos(x) | sin(x) |
| 7 | 252 | f2sin(x) | cos(x) |
| 8 | 288 | f2sin(x) | −cos(x) |
| 9 | 324 | f1cos(x) | −sin(x) |
| 10 | 360 | sin(x) | −sin(x) |

Here, $f1=\tan(\pi/5)$ and $f2=\cot(2(\pi/5))$. At any given time, controller 261 knows the last interpolation point that was encountered and the direction of travel when that point was encountered. Denote the last such point by K. If the code scale continues to move in a positive direction, the next crossing point will be K+1. If the code scale reverses direction, the next crossing point will be K−1. Hence, until one of these new crossing points is detected, the controller only needs to monitor two sets of functions. For example, if the last crossing point to be detected was point 8, controller 261 only needs to watch for f2 sin(x) crossing cos(x) and f1 cos(x) crossing −sin(x). Hence, controller 261 instructs interpolation function generator 252 to generate f2 sin(x) and f1 cos(x) in addition to the four detector functions ±sin(x) and ±cos(x).

Figure 11:
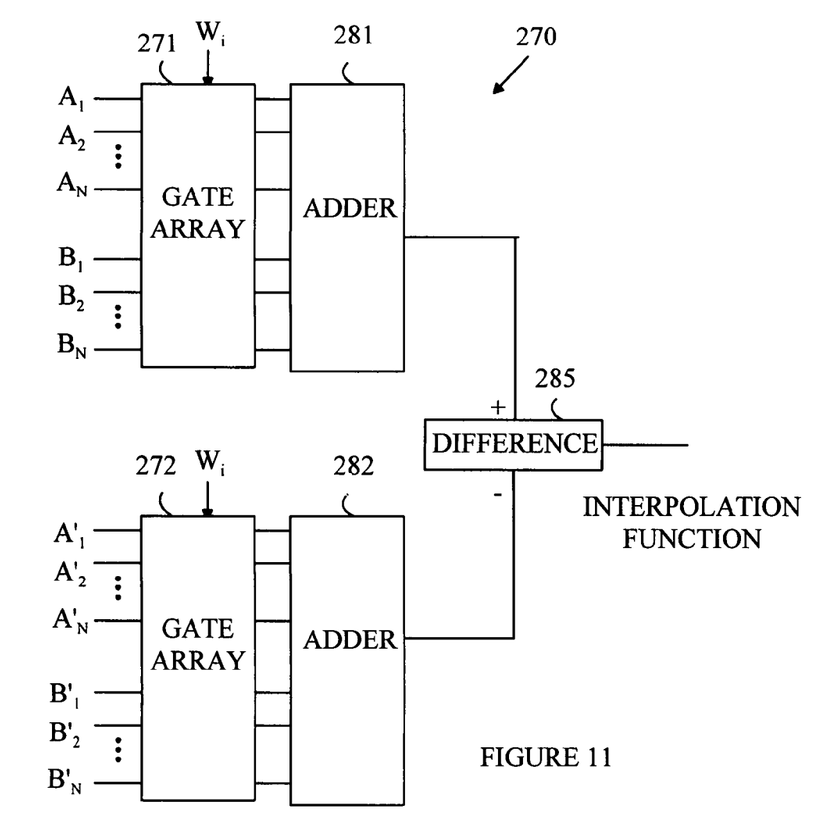
FIG. 11 is a block diagram of a circuit for generating one interpolation function, e.g. f1 $\cos(x)$ or f2 $\sin(x)$.
Figure 12A:
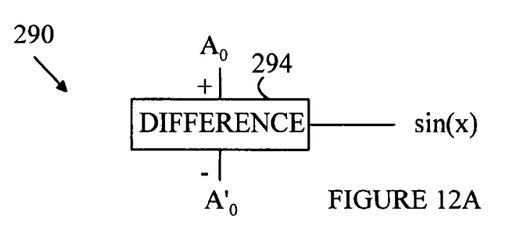
FIGS. 12A-12D are block diagrams of the circuits used to generate the four detector signals in one embodiment of the present invention.
Figure 12B:
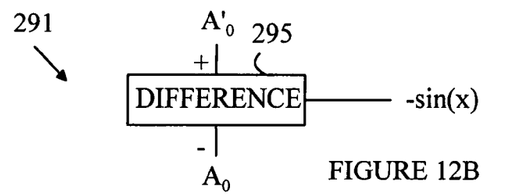
Figure 12C:
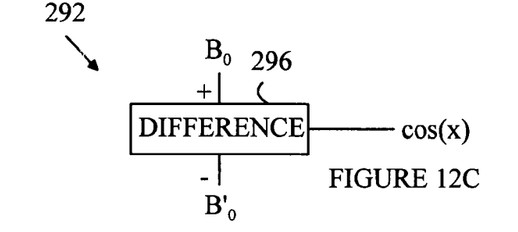
Figure 12D:
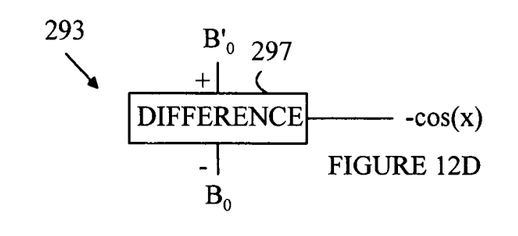

For an interpolation detector that generates both channel A and channel B signals, the interpolation function generator must generate the four detector signals and four interpolation signals, two for each channel. Refer now to FIG. 11, which is a block diagram of a circuit 270 for generating one interpolation function, e.g. $f_1$ cos(x) or f2 sin(x). The output from the A, and B photodiodes for the various rows are input to a gate array 271 having 2N inputs. A vector of coefficients Wi controls gate array 271. If the interpolation function is to be one that is proportional to sin(x), then the last N entries are 0, and the first N entries are equal to the $w_{ki}$ coefficients discussed above. If the interpolation function is to be one of the interpolation functions that is proportional to cos(x), the first N entries are 0, and the second N entries are equal to the $w_{ki}$ coefficients. If a coefficient has the value 1, the gate array passes the corresponding signal to adder 281. If the coefficient has the value 0, the signal is blocked; that is, the output line has a constant voltage of 0.

Similarly, a second gate array 272 selects the signals from the set of A' and B' signals and directs the selected signals to an adder 282. The outputs from adders 281 and 282 are combined by a difference circuit 285 to create the interpolation function specified by the $W_i$.

As noted above, for a two-channel encoder, 4 such interpolation function generators are needed. In addition, the four detector signals are generated by subtracting the corresponding entries in the first row of photodiodes. Refer to FIGS. 12A-12D, which are block diagrams of the circuits used to generate the four detector signals in one embodiment of the present invention. Detector signal generators 290 and 291 form the two differences of the photodiode signals $A_0$ and $A_0'$ in difference circuits 294 and 295 to provide the detector signals sin(x) and −sin(x), respectively. Similarly, Detector signal generators 292 and 293 form the two differences of the photodiode signals $B_0$ and $B_0'$ in difference circuits 296 and 297 to provide the detector signals cos(x) and −cos(x), respectively.

Figure 13:
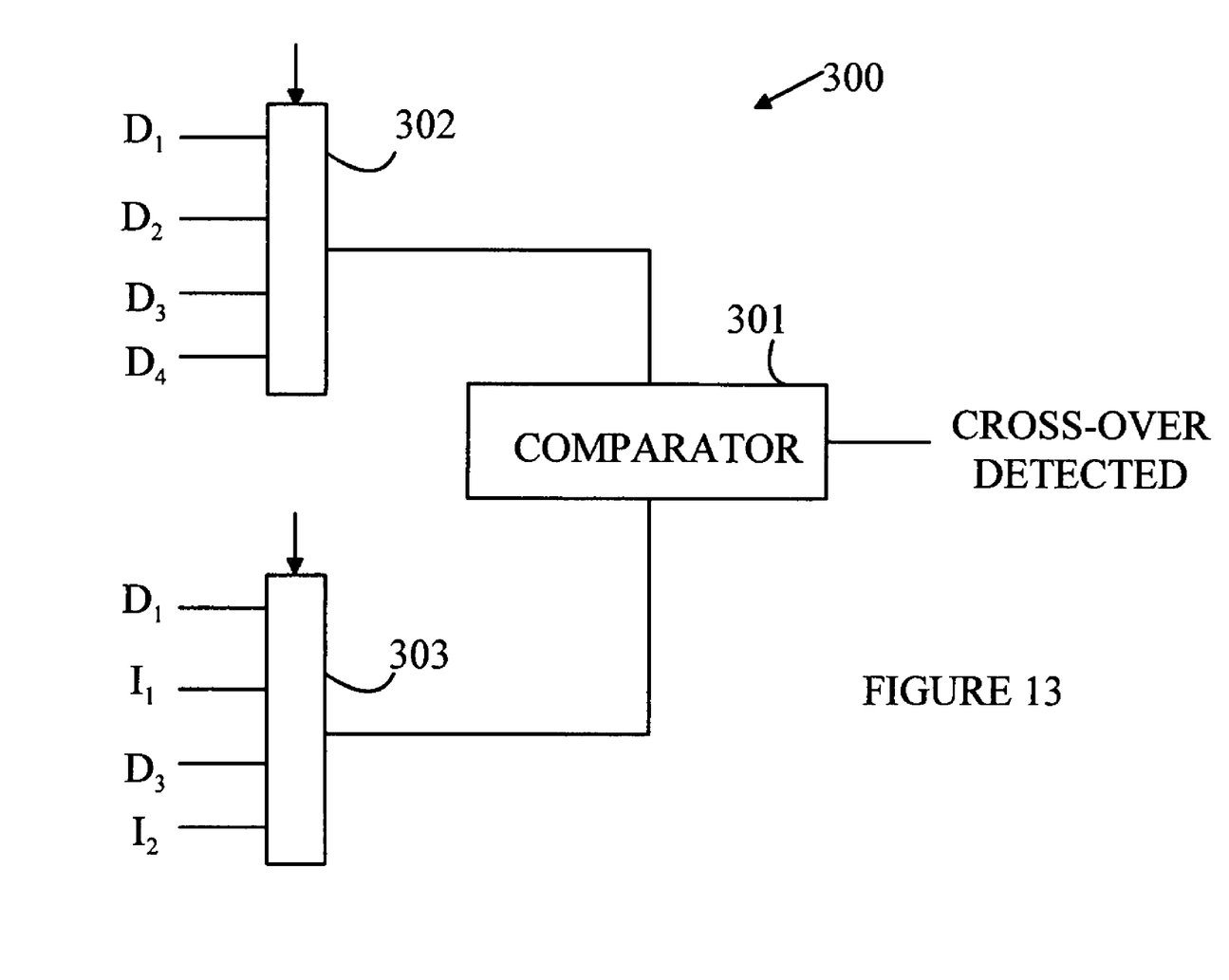
FIG. 13 is a schematic drawing of one embodiment of a cross point detection circuit for use in the present invention.

Similarly, the crossing point detector requires 4 cross-point detection circuits to monitor the two function pairs corresponding to each of the channels. To simplify the notation in the following discussion, the four detector signals sin(x), −sin(x), cos(x) and −cos(x) will be denoted by $D_1$-$D_4$, respectively, and currently active interpolation functions will be denoted by $I_1$, $I_2$, etc. Refer now to FIG. 13, which is a schematic drawing of one embodiment of a cross point detection circuit 300 for use in the present invention. Cross-point circuit 300 includes a comparator 301 that provides an output signal when the two inputs to comparator 301 are equal. The input to the first input line is selected from the detector signals by the controller by applying the appropriate selection signal to multiplexer 302. The input to the second input line is selected by the controller by applying the appropriate signals to multiplexer 303. The signal in question is chosen from the set consisting of the two detector signals sin(x), cos(x), and two interpolation signals, $I_1$ and $I_2$, that are active for the channel in which cross-point circuit 300 operates. Controller 261 discussed above monitors the output of the comparators.

The above-described embodiments have assumed that the encoder code pattern consisted of alternating rectangular stripes that move across the photodiode array. In shaft encoders, the code pattern consists of alternating stripes in which each stripe has a truncated pie shape. In this case, the shape of the detector windows must be altered to provide sinusoidal functions when these truncated pie shape stripes pass over the windows.

The above-described embodiments generate Channel A and B signals to simulate a two-channel prior art detector. However, embodiments in which the controller outputs a position and a direction of travel can also be constructed.

Various modifications to the present invention will become apparent to those skilled in the art from the foregoing description and accompanying drawings. Accordingly, the present invention is to be limited solely by the scope of the following claims.

What is claimed is:

1. An interpolating detector for generating a position signal indicating a change in the relative position of a code pattern comprising alternating light and dark stripes, said interpolating detector comprising:

a photodiode array comprising a plurality of sets of photodetectors, each set labeled with an index i that runs from 0 to N, said $i^{th}$ set comprising photodiodes that generate four signals:

$$A_i = O_i + F_i \sin(x),$$

$$B_i = O_i + F_i \cos(x)$$

$$A_i' = O_i - F_i \sin(x), \text{ and}$$

$$B_i' = O_i - F_i \cos(x),$$

when said code pattern moves across said photodiode array, wherein $F_i$ and $O_i$ are constants and x denotes a relative position of said code pattern with respect to said interpolating detector, x changing by $2\pi$ when said code pattern moves a distance equal to the width of one light stripe and one dark stripe, and wherein N>2;

an interpolation function generator that generates first and second interpolation functions, $I_1(x) = f1\cos(x)$ and $I_2(x) = f2\sin(x)$, respectively, from said photodiode signals wherein f1 and f2 are constants;

a detector function generator that generates 4 detector signals, $D_1(x) - D_4(x)$, from said photodiode signals, $D_1(x)$ and $D_3(x)$ being proportional to $\sin(x)$ and $-\sin(x)$, respectively, and $D_2(x)$ and $D_4(x)$ being proportional to $\cos(x)$ and $-\cos(x)$, respectively; and a cross-point detector that generates a transition signal when $I_1(x)$ crosses $D_1$ or $D_3$ or when $I_2(x)$ crosses $D_2$ or $D_4$, wherein said photodiodes have active areas having a shape such that said x values at which said interpolation signals cross said detector signals occur at integer multiples of $2\pi/m$, for m greater than 4.

2. The interpolating detector of claim 1 wherein said interpolation function generator comprises a circuit for subtracting two of said photodiode signals having the same value of i.

3. The interpolating detector of claim 1 wherein said interpolation function generator comprises a first circuit for summing selected ones of said photodiode signals to form a first summed signal.

4. The interpolating detector of claim 3 wherein said interpolation function further comprises a second circuit for summing selected ones of said photodiode signals to form a second summed signal and a circuit for subtracting said first and second summed signals to generate one of said interpolation signals.

5. The interpolating detector of claim 3 wherein said selected ones of said photodiode signals are specified by a selection signal input to said interpolation detector.

6. The interpolating detector of claim 5 further comprising a controller that receives a signal specifying m and provides said selection signal to said interpolation function detector.

7. The interpolating detector of claim 5 further comprising a memory for storing a value of x corresponding to a previous transition signal being generated and wherein said selected ones of said photodiode signals depend on said stored value.

8. The interpolating detector of claim 1 further comprising an output signal generator that generates a signal that transitions between first and second values each time said cross-point detector generates said transition signal.

* * * * *